March 26, 1935.    F. B. JENNINGS    1,995,985
FISH LURE
Filed Sept. 21, 1933
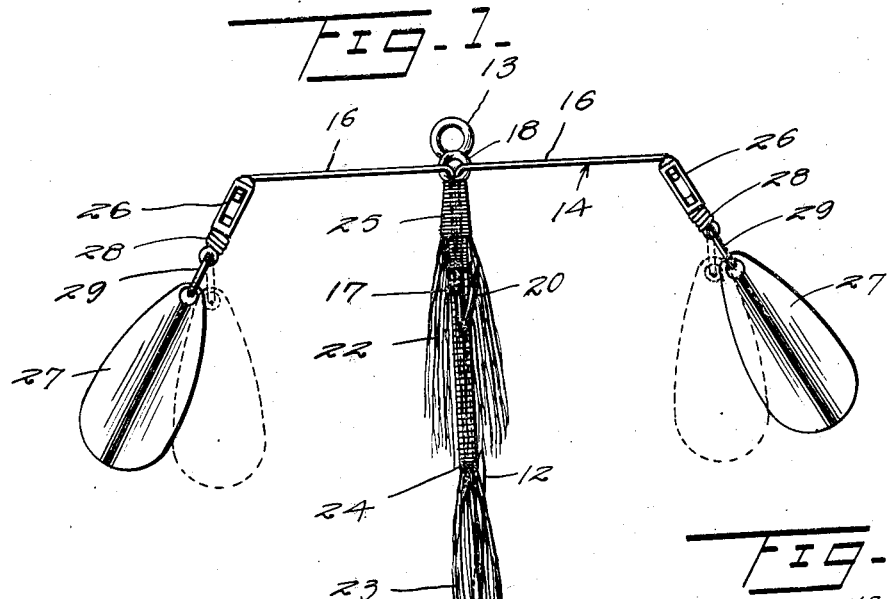
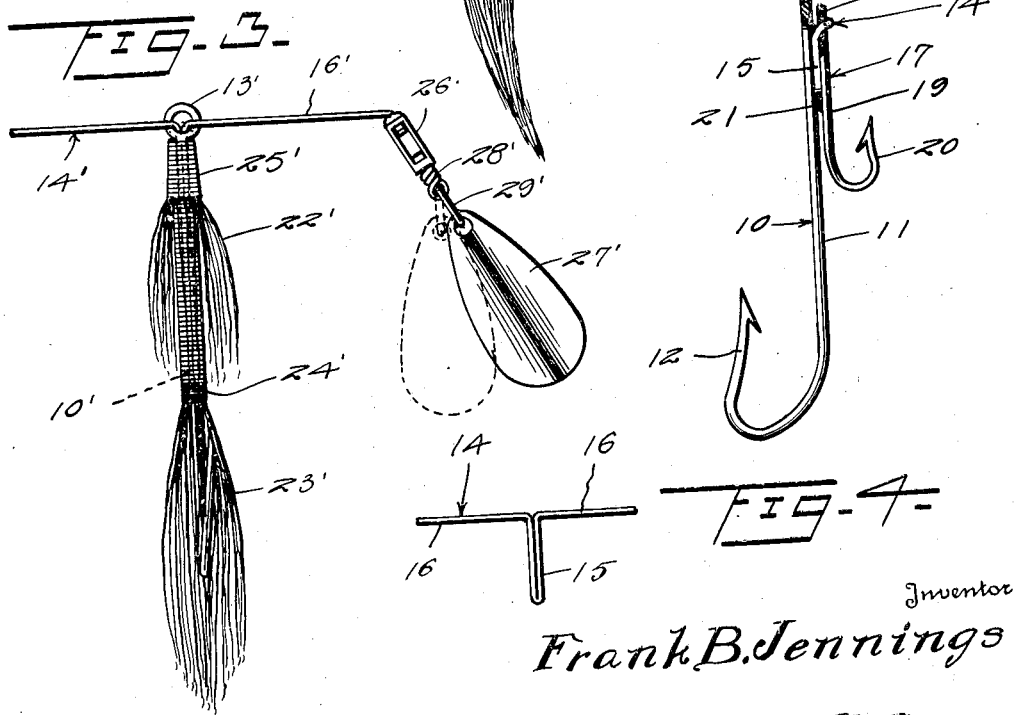
Inventor
Frank B. Jennings
By Watson E. Coleman
Attorney Patented Mar. 26, 1935

1,995,985

UNITED STATES PATENT OFFICE 1,995,985

FISH LURE

Frank B. Jennings, Olympia, Wash.

Application September 21, 1933, Serial No. 690,490

2 Claims. (Cl. 43—39)

This invention relates to fish lures and has for an important object thereof the provision of a lure which is constructed to closely simulate an insect in the form of a fly or the like, in action, color and shape.

Another object of this invention is to provide a lure of this type which is exceedingly simple in construction and includes not only means simulating an insect such as a fly or the like, but also includes means whereby a bait of desired character may be mounted on the lure.

The above and various other objects and advantages of this invention will in part be described and in part be understood from the following detailed description of the present preferred embodiment, the same being illustrated in the accompanying drawing wherein:—

Figure 1 is a detail rear elevation of a lure constructed according to the preferred embodiment of this invention.

Figure 2 is a longitudinal section partly in detail of the lure with the insect simulating means removed from the hooks.

Figure 3 is a front elevation partly broken away of a modified form of this lure.

Figure 4 is a side elevation of the T-shaped spinner supporting member removed from the hook structure.

Referring to the drawing wherein like numerals of reference indicate corresponding parts throughout the several views, the numeral 10 designates generally a fish hook, including a shank 11, a barb 12 and an eye 13. A T-shaped spinner supporting member, generally designated as 14, has the stem 15 thereof secured to the shank 11 of the hook 10 at a point intermediate the eye 13, and the barb 12 and the cross arms 16 of the spinner supporting member 14 are disposed at substantially right angles to the length of the shank 11.

The spinner supporting member, in the present instance, as shown in Figure 2, has the stem 15 thereof projected through a bait holding hook 17, and the stem 15 is extended through the eye 18 of this hook 17 and interposed between the shank 11 of the hook 10 and the shank 19 of the hook 17. The barb 20 of the hook 17 is disposed reversely from the barb 12 of the hook 10 and, in the present instance, the hook 17 is relatively shorter in length than the hook 10.

The hooks 10 and 17 and the stem 15 of the spinner supporting member 14 are secured together, as shown in Figure 2, by means of solder 21 or other suitable securing means, so that the two hooks 10 and 17 will not move one relative to the other, and the spinner supporting member 14 will not move relative to either of the two hooks. The hooks 10 and 17 are partially or substantially covered by means of hair or fiber members 22 and 23. The fiber members 23 are secured as by a wrapping such as thread, string or the like 24 to the periphery of the shank 11 of the hook 10, and the free ends of the fibers 23 substantially enclose the barb 12 so that when the lure is in the water, only a slight portion of the barb 12 will be exposed.

The fibers or hair 22 are secured about the upper or inner end of the shank 11 and also about the shank 19 of the hook 17 as by wrapping or string 25. The free ends of the fibers or hair 22 extend about the barb 20 after the manner of the fibers 23 so as to partially hide or enclose the barb 20. This barb 20 is adapted to receive a bait of suitable character which will be exposed through the fibers or hair 22 so as to attract the desired fish.

The spinner supporting arms 16 of the member 14 have attached at their outer ends one portion 26 of a swivel, and this swivel portion 26, in the present instance, is preferably fixed relative to the arm 16. A spinner 27 is secured to another portion 28 of the swivel by means of a ring 29. Each arm 16 has a spinner 27 swivelly attached thereto, as shown in Figure 1 of the drawing, and each spinner may be relatively transparent and colored or may be solid and light reflecting and also colored to reflect light rays of various colors.

In Figure 3, there is disclosed a modified form of this structure wherein the hook 10' is provided with a spinner supporting member 14' secured through the eye 13' of the hook 10' after the manner of the spinner supporting member 14 which is secured to the hook 17. The hook 10' has disposed thereabout hair or fiber members 23' held in position by means of a wrapping in the form of string or thread 24'. A second hair or fiber structure 22' is secured to the hook 10 adjacent the upper or inner end thereof by means of wrapping 25'. The oppositely extending cross arms 16' of the spinner supporting member 14' have attached thereto one portion of a swivel 26' and a spinner 27' is swivelly secured to the swivel element 26' by means of a rotatable swivel member 28' which is connected to one end of the spinner 27' by means of a ring 29'.

In the use of this device, where it is desired to use a bait in addition to the lure shown in Figure 1, the bait may be mounted on the bait hook 17 and the eye 13 engaged with one end of the fish line. The lure is then drawn slowly through the water and will be maintained on a substantially even or horizontal plane by means of the spinners 27 which are constructed in a manner to simulate the wings of an insect which it is desired to simulate by means of the fibers 22 and 23. As shown in the drawing, the swivel structure including the members 26 and 28 are disposed obliquely to the length of the arms 16 so as to maintain the spinners or wing members 27 the desired distance away from the hooks 17 and 10. In this manner, the spinners 27 will not interfere with the visibility of the bait on the hook 20. The device herein disclosed, where used with bait on the hook 17, is of a size such that when the fish attempts to remove the bait from the hook 17, the fish will at the same time grasp the barb 12 of the hook 10 and will thereby be caught on the hook 10. Where it is not desired to use bait in addition to the imitation fly or insect, the embodiment disclosed in Figure 3 can be used and in this structure, the lure is moved slowly through the water and the spinners 27' will be permitted to move after the manner of the wings of the fly or insect and can also rotate, and as these members 27' are preferably highly polished so as to reflect light rays, they will attract the attention of the fish.

It is, of course, understood that various changes and modifications may be made in the details of construction and design of the above specifically described embodiment of this invention without departing from the spirit thereof, such changes and modifications being restricted only by the scope of the following claims.

What is claimed is:—

1. A lure as set forth comprising in combination, a pair of hooks disposed in opposed relation, means disposed about the shanks of the hooks to simulate the body of an insect, said means partially covering the barbs of the hooks, a T-shaped spinner supporting member having the stem portion thereof projected through the eye of one of the hooks and extending longitudinally of the hooks and between the shanks thereof, a pair of spinner members, and obliquely disposed means for swivelly mounting the spinner members on the outer ends of the spinner supporting member.

2. A lure as set forth comprising a relatively large hook, a relatively small hook disposed in opposed relation to the first hook, a T-shaped spinner supporting member having the stem portion thereof projected through the eye of the second hook and disposed between the two hooks, means for securing the hooks and the spinner supporting member together, and spinners carried by the outer ends of the spinner supporting member in a manner whereby said spinners may move independently of the first and second hooks.

FRANK B. JENNINGS.